May 20, 1930.　　　　R. LITTLER, SR　　　　1,759,650
SAFETY DEVICE FOR CRANKING AND ELECTRIC STARTER FOR AUTOMOBILES
Filed March 7, 1927
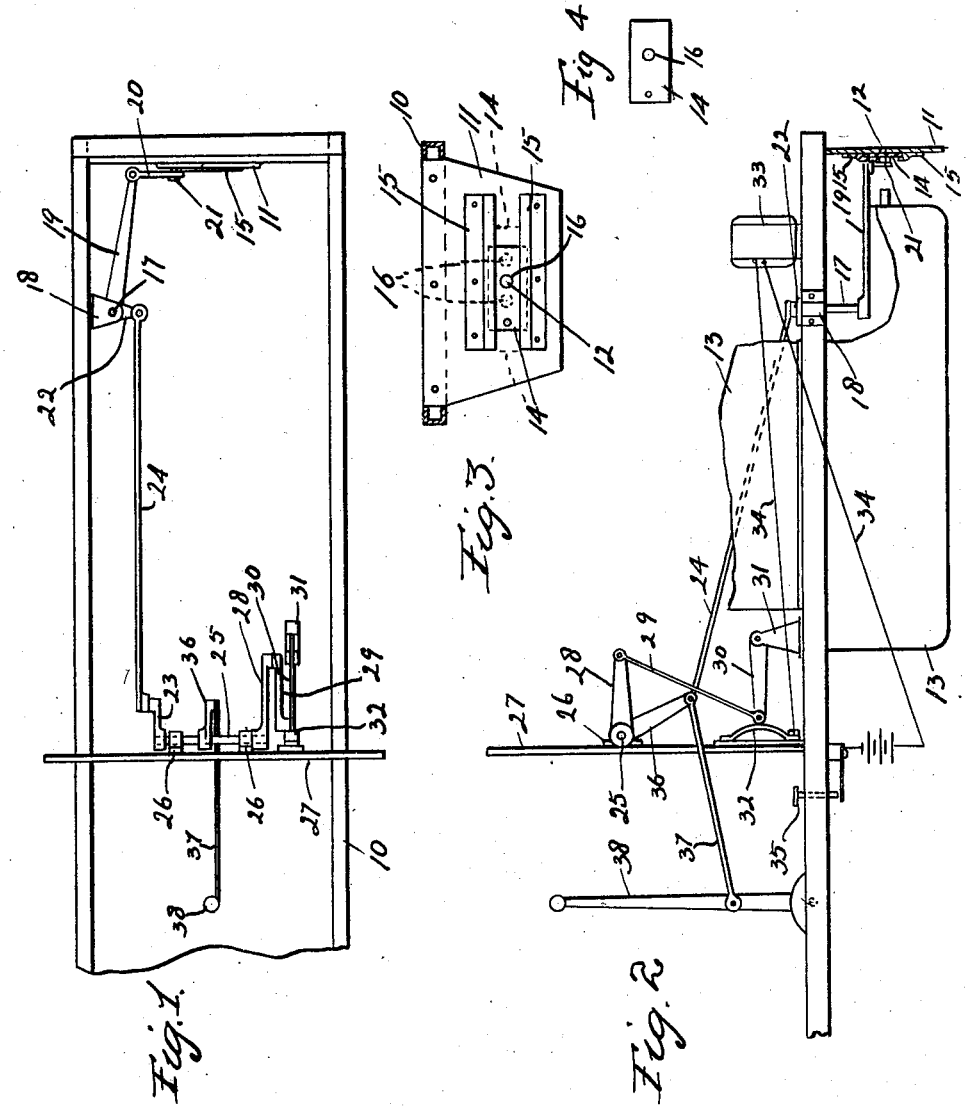
Inventor
Robert Littler Sr.

Patented May 20, 1930

1,759,650

UNITED STATES PATENT OFFICE

ROBERT LITTLER, SR., OF PHILADELPHIA, PENNSYLVANIA, ASSIGNOR TO MARTHA E. LITTLER, OF PHILADELPHIA, PENNSYLVANIA

SAFETY DEVICE FOR CRANKING AND ELECTRIC STARTER FOR AUTOMOBILES

Application filed March 7, 1927. Serial No. 173,405.

My invention relates to new and useful improvement for safety devices for cranking and electric starter for automobiles, and has for its object to provide an exceedingly simple and effective device of this description which will eliminate the possibility of starting the engine of an automobile either by cranking or by the usual electric starter unless the shift is in neutral.

A further object of my invention is to so construct such a device that it will automatically function in co-action with the gear shifting lever.

With these and other ends in view:

Fig. 1, is a plan view of a portion of an automobile chassis showing my improved safety device applied thereto.

Fig. 2, is a side elevation of Fig. 1.

Fig. 3, is a front end view of a portion of the machine showing the apron or shield plate through which the crank for starting the engine is usually inserted.

Fig. 4, is a detail of the safety slide plate.

In carrying out my invention as here embodied, 10 represents a portion of an automobile carrying the apron or shield plate 11 in the front thereof, which apron has the usual hole or opening 12 for the insertion of the crank for starting the engine which latter is indicated at 13 in Fig. 2.

14 represents the safety slide plate which is mounted in the guide ways 15 so to slide back and forth crosswise of the hole 12, and in this slide is also formed a hole 16 of the same general size as the hole 12; the object being when the hole 16 registers with the hole 12 the crank may be inserted before starting the engine, but when these holes do not register the crank cannot be inserted, and consequently, the engine cannot be started.

17 represents a short shaft journalled into bearing 18, the latter being mounted in the frame of the machine, and the lower end of this short shaft carries the arm 19 which is connected by the link 20 with the safety slide plate 14 by the stud 21.

The upper end of short shaft 17 carries the short lever 22, and this short lever is connected with the lever 23 by the connecting rod 24; the lever 23 being secured on one end of the horizontal shaft 25, the latter being mounted in suitable bearings 26 secured to the instrument board 27 or some other convenient portion of the machine. Upon the opposite end of this horizontal shaft 25 is secured a lever 28 to which is pivoted the connecting rod 29, the lower end of said rod being pivoted to the electric actuating switch bar 30, which latter is pivoted to the bracket 31 mounted upon the machine.

32 represents the movable member of an electric switch or circuit closer so mounted that when the bar 30 is in the position shown in Fig. 2 the circuit 34, which includes the starting motor 33, will be closed with the exception of foot switch 35 so that the actuation of this switch 35 will permit the motor 33 to be put into operation in the usual manner, but when the actuating bar 30 is drawn out of contact with the movable member 32, this circuit will be opened, and therefore, the motor cannot be started even though the foot switch 35 is closed.

36 represents an arm secured to the horizontal shaft 25, and this arm is connected by the rod 37 to the ordinary gear shifting lever 38 from which it will be seen that when this lever is in the position representing neutral, here shown as being vertical, the starting motor may be put into operation or a crank may be inserted through the hole 12 for the starting of the engine manually, but when the lever 38 is moved either forward or backward the mechanism previously described will open the circuit through the movable member 32 and will shift the safety slide plate 14, to one side or the other thus carrying the hole 16 out of alignment with the hole 12, thereby preventing the running of the starting motor or the insertion of a crank for starting the engine.

From the foregoing description it will be obvious that the engine of the automobile equipped with my improved safety device cannot be started when the transmission is in gear, thus entirely avoiding the many and serious accidents and loss of life incident to the present construction of such machines.

The gist of my invention rests in the broad idea of preventing the manual cranking or power starting of the engine of a motor vehicle when the transmission is set for transmitting power from the engine to the drive wheels of the vehicle, and I therefore, do not limit myself to the details of construction here shown, as these may be varied within the scope of the appended claims without departing from the spirit of my invention.

Having thus fully described my invention, what I claim as new and useful is:

1. In a safety device for automobiles, an apron carried by the automobile and provided with an opening in alignment with the crank shaft, a pair of parallel transverse horizontal guides on said apron, one above and the other below the opening, an apertured plate slidably mounted in said guides to prevent insertion of a crank for engagement with the engine shaft except when the aperture in said plate registers with the hole in the apron, said plate being supported by the guides to prevent accidental deformation thereof, an horizontal shaft, arms carried by said shaft, means to connect one of said arms with the transmission lever of the automobile, a vertical shaft, means to connect the other arm of the horizontal shaft with one of the arms of the vertical shaft and a link to connect the other arm of the vertical shaft with the plate whereby operation of the transmission lever will slide the plate horizontally in the guides.

2. The structure set forth in the claim 1 in combination with a starting motor, an electrical circuit including said motor, a source of electrical energy, a switch and a circuit breaker, means co-operating with the circuit breaker to actuate the same, another arm on the horizontal shaft, and means to connect said last named arm with the circuit breaker actuating means whereby said circuit breaker will be simultaneously operated with the slide and the electrical circuit put in operative condition only when the aperture in the plate is in registration with the hole in the apron.

3. In a device of the kind disclosed, the combination of an automobile engine starting motor, a circuit including said motor, a source of electrical energy, a switch and a circuit breaker, apertured means located in front of the crank receiving end of the automobile engine shaft and acting as a barrier to the application of a starting crank except when the aperture is in alignment with the crank receiving end of the shaft, means for actuating the circuit breaker and a mechanism connected with the apertured means, the circuit breaker actuating means and the automobile transmission lever whereby movement of the latter will operate both last mentioned means simultaneously to prevent starting of the engine by means of the starting motor or a crank except when the transmission lever is in a neutral position.

In testimony whereof, I have hereunto affixed my signature.

ROBERT LITTLER, Sr.